US012124194B2

(12) United States Patent
Sugiyama et al.

(10) Patent No.: US 12,124,194 B2
(45) Date of Patent: Oct. 22, 2024

(54) HEATING DEVICE, FIXING DEVICE, AND IMAGE FORMING APPARATUS

(71) Applicants: Ryohhei Sugiyama, Kanagawa (JP); Takayuki Andoh, Kanagawa (JP); Masahiro Samei, Kanagawa (JP); Kota Shiodera, Tokyo (JP); Hiroshi Yoshinaga, Chiba (JP)

(72) Inventors: Ryohhei Sugiyama, Kanagawa (JP); Takayuki Andoh, Kanagawa (JP); Masahiro Samei, Kanagawa (JP); Kota Shiodera, Tokyo (JP); Hiroshi Yoshinaga, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/176,845

(22) Filed: Mar. 1, 2023

(65) Prior Publication Data

US 2023/0305451 A1 Sep. 28, 2023

(30) Foreign Application Priority Data

Mar. 22, 2022 (JP) ................................. 2022-044875
Nov. 21, 2022 (JP) ................................. 2022-185660

(51) Int. Cl.
*G03G 15/20* (2006.01)

(52) U.S. Cl.
CPC ..... *G03G 15/2007* (2013.01); *G03G 15/2053* (2013.01)

(58) Field of Classification Search
CPC ....................... G03G 15/2007; G03G 15/2053
See application file for complete search history.

(56) References Cited

U.S. PATENT DOCUMENTS

2007/0196152 A1 8/2007 Shimizu et al.
2011/0044734 A1 2/2011 Shimokawa et al.
2011/0052245 A1 3/2011 Shinshi et al.
2011/0064437 A1 3/2011 Yamashina et al.
2011/0222875 A1 9/2011 Imada et al.
2011/0222888 A1 9/2011 Ikebuchi et al.
(Continued)

FOREIGN PATENT DOCUMENTS

JP 2013-178511 9/2013
JP 2017-120331 7/2017

OTHER PUBLICATIONS

U.S. Appl. No. 17/842,794, filed Jun. 17, 2022, Ryohhei Sugiyama.
(Continued)

*Primary Examiner* — Sandra Brase
(74) *Attorney, Agent, or Firm* — Harness, Dickey & Pierce, P.L.C.

(57) ABSTRACT

A heating device includes a rotator, a heating source, a reflector, a rotator holder, and a liquid or semi-solid substance. The rotator is rotatably held. The heating source heats the rotator. The reflector includes a reflection face that reflects radiant heat emitted from the heating source. The reflection face has a reflectance lower at each end portion of the reflection face in a longitudinal direction of the rotator than at a center portion of the reflection face in the longitudinal direction of the rotator. The rotator holder holds a longitudinal end portion of the rotator. The liquid or semi-solid substance has lubricity and adheres to the rotator holder.

16 Claims, 11 Drawing Sheets

(56) References Cited

U.S. PATENT DOCUMENTS

| | | | | |
|---|---|---|---|---|
| 2011/0222931 | A1 | 9/2011 | Shinshi et al. | |
| 2011/0274453 | A1 | 11/2011 | Shimokawa et al. | |
| 2012/0177388 | A1 | 7/2012 | Imada et al. | |
| 2013/0045032 | A1 | 2/2013 | Shimokawa et al. | |
| 2013/0164056 | A1 | 6/2013 | Imada et al. | |
| 2013/0195523 | A1 | 8/2013 | Yamaji et al. | |
| 2013/0209147 | A1 | 8/2013 | Ogawa et al. | |
| 2014/0341627 | A1 | 11/2014 | Yoshikawa et al. | |
| 2015/0346661 | A1* | 12/2015 | Yotsutsuji .......... | G03G 15/2053 399/329 |
| 2017/0176898 | A1* | 6/2017 | Izawa ................ | G03G 15/2053 |
| 2017/0185015 | A1 | 6/2017 | Yoshinaga et al. | |
| 2018/0120741 | A1* | 5/2018 | Yoshinaga ......... | G03G 15/2039 |
| 2018/0267449 | A1 | 9/2018 | Naitoh et al. | |
| 2020/0387094 | A1* | 12/2020 | Yamaguchi ........ | G03G 15/2025 |
| 2022/0026834 | A1 | 1/2022 | Yoshinaga | |

OTHER PUBLICATIONS

U.S. Appl. No. 18/160,080, filed Jan. 26, 2023, Daisuke Inoue, et al.
U.S. Appl. No. 18/163,591, filed Feb. 2, 2023, Takayuki Andoh, et al.
U.S. Appl. No. 18/162,872, filed Feb. 1, 2023, Hiroshi Yoshinaga, et al.

* cited by examiner

HEATING DEVICE, FIXING DEVICE, AND IMAGE FORMING APPARATUS

CROSS-REFERENCE TO RELATED APPLICATIONS

This patent application is based on and claims priority pursuant to 35 U.S.C. § 119(a) to Japanese Patent Application Nos. 2022-044875, filed on Mar. 22, 2022, and 2022-185660, filed on Nov. 21, 2022, in the Japan Patent Office, the entire disclosure of each of which is hereby incorporated by reference herein.

BACKGROUND

Technical Field

Embodiments of the present disclosure relate to a heating device, a fixing device, and an image forming apparatus.

Related Art

As an example of a heating device included in an image forming apparatus such as a copier or a printer, a fixing device is known that heats a recording medium such as a sheet of paper and fixes an unfixed image onto the recording medium.

Such a fixing device includes a pair of rotators that contact each other and a heating source that heats at least one of the rotators. When a sheet passes through an area of contact between the rotators, the unfixed image on the sheet is fixed under heat and pressure. To efficiently heat the rotator, some fixing devices include a reflector that reflects, toward the rotator, radiant heat emitted from the heating source. With such a reflector, the rotator is efficiently heated by the radiant heat emitted from the heating source directly toward the rotator and the radiant heat emitted from the heating source and reflected by the reflector toward the rotator.

In a heating device such as the fixing device, a lubricant such as oil or grease is typically used to smoothly rotate the rotator. When the temperature of such a lubricant rises due to the heat from the heating source disposed in the heating device, some low-molecular-weight components of the lubricant are volatilized and aggregated when cooled in the atmosphere. Thus, fine particles may be generated.

Currently, regulations regarding fine particles (i.e., particles having a diameter of 100 nm to 2500 nm) discharged from products have been strengthened. For example, the German Blue Angel standard specifies reference values for the number of generated fine particles and ultrafine particles having a diameter of 5.6 nm to 560 nm (number/10 minutes). Thus, the generation of fine particles and ultrafine particles from a lubricating substance such as the lubricant is to be reduced.

SUMMARY

According to an embodiment of the present disclosure, a novel heating device includes a rotator, a heating source, a reflector, a rotator holder, and a liquid or semi-solid substance. The rotator is rotatably held. The heating source heats the rotator. The reflector includes a reflection face that reflects radiant heat emitted from the heating source. The reflection face has a reflectance lower at each end portion of the reflection face in a longitudinal direction of the rotator than at a center portion of the reflection face in the longitudinal direction of the rotator. The rotator holder holds a longitudinal end portion of the rotator. The liquid or semi-solid substance has lubricity and adheres to the rotator holder.

According to an embodiment of the present disclosure, a novel fixing device includes the heating device and a counter rotator. The heating device heats a recording medium bearing an unfixed image. The counter rotator faces an outer circumferential surface of the rotator of the heating device to fix the unfixed image onto the recording medium.

According to an embodiment of the present disclosure, a novel image forming apparatus includes the fixing device.

According to an embodiment of the present disclosure, a novel image forming apparatus includes the heating device.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
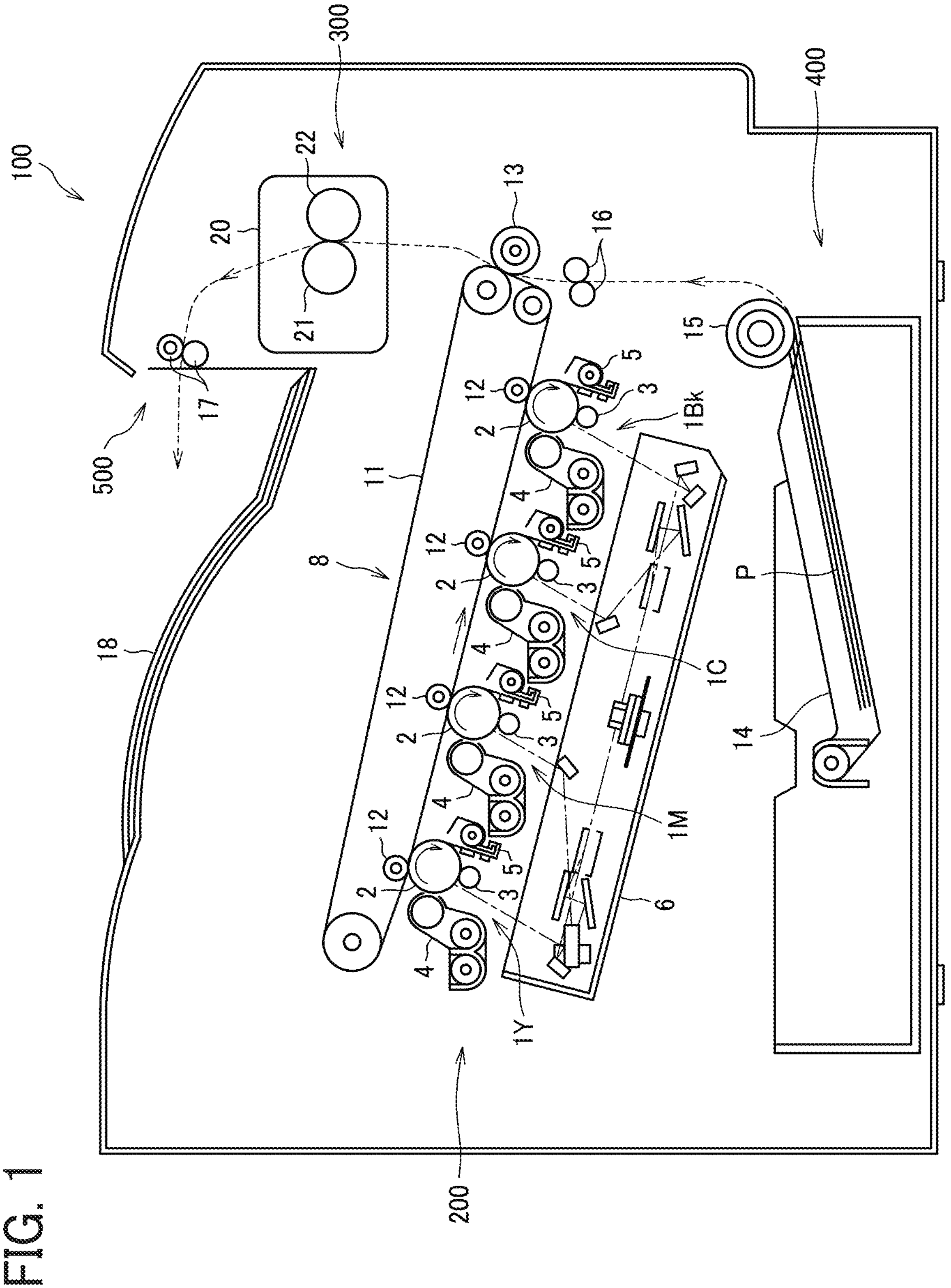
FIG. 1 is a schematic diagram illustrating a configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a,” “an,” and “the” are intended to include the plural forms as well, unless the context clearly indicates otherwise.

For the sake of simplicity, like reference numerals are given to identical or corresponding constituent elements such as parts and materials having the same functions, and redundant descriptions thereof are omitted unless otherwise required.

Note that, in the following description, suffixes Y, M, C, and Bk denote colors of yellow, magenta, cyan, and black, respectively. To simplify the description, these suffixes are omitted unless necessary.

As used herein, the term “connected/coupled” includes both direct connections and connections in which there are one or more intermediate connecting elements.

FIG. 1 is a schematic diagram illustrating a configuration of an image forming apparatus according to an embodiment of the present disclosure.

In the following description, the “image forming apparatus” may be a printer, a copier, a scanner, a facsimile machine, or a multifunction peripheral having at least two of printing, copying, scanning, and facsimile functions. “Image formation” means the formation of images with meanings such as characters and figures and the formation of images with no meanings such as patterns. Initially, with reference to FIG. 1, a description is given of the overall configuration and operation of an image forming apparatus 100 according to the present embodiment.

As illustrated in FIG. 1, the image forming apparatus 100 according to the present embodiment includes an image forming section 200, a fixing section 300, a recording-medium supplying section 400, and a recording-medium ejecting section 500. The image forming section 200 forms an image on a sheet-like recording medium such as a sheet of paper. The fixing section 300 fixes the image onto the recording medium. The recording-medium supplying section 400 supplies the recording medium to the image forming section 200. The recording-medium ejecting section 500 ejects the recording medium to the outside of the image forming apparatus 100.

The image forming section 200 includes four process units 1Y, 1M, 1C, and 1Bk as image forming units, an exposure device 6, and a transfer device 8. The exposure device 6 forms an electrostatic latent image on a photoconductor 2 included in each of the process units 1Y, 1M, 1C, and 1Bk. The transfer device 8 transfers an image onto the recording medium.

The process units 1Y, 1M, 1C, and 1Bk have identical configurations, except that the process units 1Y, 1M, 1C, and 1Bk contain toners as developers in different colors, namely, yellow (Y), magenta (M), cyan (C), and black (Bk) corresponding to color-separation components of a color image. Specifically, each of the process units 1Y, 1M, 1C, and 1Bk includes the photoconductor 2, a charger 3, a developing device 4, and a cleaner 5. The photoconductor 2 serves as an image bearer having a surface that bears an electrostatic latent image and a resultant toner image. The charger 3 charges the surface of the photoconductor 2. The developing device 4 supplies toner as a developer to the electrostatic toner image formed on the surface of the photoconductor 2, rendering the electrostatic latent image visible as a toner image. In short, the developing device 4 forms a toner image on the photoconductor 2. The cleaner 5 cleans the surface of the photoconductor 2.

The transfer device 8 includes an intermediate transfer belt 11, four primary transfer rollers 12, and a secondary transfer roller 13. The intermediate transfer belt 11 is an endless belt entrained around a plurality of support rollers. The four primary transfer rollers 12 are disposed inside a loop formed by the intermediate transfer belt 11. Each of the four primary transfer rollers 12 contacts the corresponding photoconductor 2 via the intermediate transfer belt 11 to form an area of contact, called a primary transfer nip, between the intermediate transfer belt 11 and the photoconductor 2. The secondary transfer roller 13 contacts an outer circumferential surface of the intermediate transfer belt 11 to form an area of contact, called a secondary transfer nip, between the secondary transfer roller 13 and the intermediate transfer belt 11.

The fixing section 300 includes a fixing device 20 as a heating device that heats the recording medium bearing the transferred image. The fixing device 20 includes a fixing belt 21 and a pressure roller 22. The fixing belt 21 heats the image on the recording medium. The pressure roller 22 contacts the fixing belt 21 to form an area of contact, called a fixing nip, between the fixing belt 21 and the pressure roller 22.

The recording-medium supplying section 400 includes an input tray 14 and a sheet feeding roller 15. Sheets P as recording media are stored on the input tray 14. The sheet feeding roller 15 feeds the sheets P one at a time from the input tray 14. Although the “recording medium” will be described as a “sheet” below, the “recording medium” is not limited to a sheet of paper. Examples of the “recording medium” include, but are not limited to, a sheet of paper, an overhead projector (OHP) transparency, fabric, a metal sheet, a plastic film, or a prepreg sheet obtained by impregnating carbon fibers with a resin in advance. The sheet of paper may be a sheet of plain paper, thick paper, thin paper, coated paper such as art paper, or tracing paper. Examples of the sheet of paper include, but are not limited to, a postcard and an envelope in addition to the aforementioned kinds of sheets of paper.

The recording-medium ejecting section 500 includes an output roller pair 17 and an output tray 18. The output roller pair 17 ejects or outputs the sheet P to the outside of the image forming apparatus 100. The sheet P that is ejected by the output roller pair 17 rests on the output tray 18.

To provide a fuller understanding of the embodiments of the present disclosure, a description is now given of the printing operation of the image forming apparatus 100 according to the present embodiment, with continued reference to FIG. 1.

As the image forming apparatus 100 starts the image forming operation, the photoconductor 2 of each of the process units 1Y, 1M, 1C, and 1Bk and the intermediate transfer belt 11 of the transfer device 8 start rotating. The sheet feeding roller 15 also starts rotating to feed the sheet P from the input tray 14. The fed sheet P comes into contact with a timing roller pair 16 and stops. Thus, the conveyance of the sheet P is temporarily stopped until an image to be transferred to the sheet P is formed.

In each of the process units 1Y, 1M, 1C, and 1Bk, the charger 3 uniformly charges the surface of the photoconductor 2 at a high electric potential. According to image information of a document read by a document reading device or print information instructed to print by a terminal, the exposure device 6 exposes the charged surface of each of the photoconductors 2. As a result, the electric potential at an exposed portion on the surface of each of the photoconductors 2 is decreased. Thus, an electrostatic latent image is formed on the surface of each of the photoconductors 2. The developing device 4 supplies toner to the electrostatic latent image, rendering the electrostatic latent image visible as a toner image. Thus, a toner image is formed on the surface of each of the photoconductors 2. As the photoconductor 2 rotates, the toner image that is thus formed on the photoconductor 2 reaches the primary transfer nip defined by the primary transfer roller 12. At the primary transfer nip, the toner image is transferred onto the intermediate transfer belt 11 rotating. Specifically, the toner images are sequentially transferred from the respective photoconductors 2 onto the intermediate transfer belt 11 such that the toner images are superimposed one atop another, as a composite full-color toner image on the intermediate transfer belt 11. Thus, a full-color toner image is formed on the intermediate transfer belt 11. Any one of the process units 1Y, 1M, 1C, and 1Bk may be used to form a monochrome image. Alternatively, any two or three of the process units 1Y, 1M, 1C, and 1Bk may be used to form a bicolor image or tricolor image, respectively. After the toner image is transferred onto the intermediate transfer belt 11, the cleaner 5 removes residual toner from the photoconductor 2. The residual toner refers to toner that has failed to be transferred onto the intermediate transfer belt 11 and therefore remains on the surface of the photoconductor 2.

As the intermediate transfer belt 11 rotates, the full-color toner image on the intermediate transfer belt 11 is conveyed to the secondary transfer nip defined by the secondary transfer roller 13. At the secondary transfer nip, the full-color toner image is transferred onto the sheet P conveyed by the timing roller pair 16. The sheet P bearing the full-color toner image is conveyed to the fixing device 20. In the fixing device 20, the fixing belt 21 and the pressure roller 22 apply heat and pressure to the toner image on the sheet P to fix the toner image onto the sheet P. Then, the sheet P bearing the fixed toner image is conveyed to the recording-medium ejecting section 500. In the recording-medium ejecting section 500, the output roller pair 17 ejects the sheet P onto the output tray 18. Thus, a series of printing operations is completed.

Figure 2:
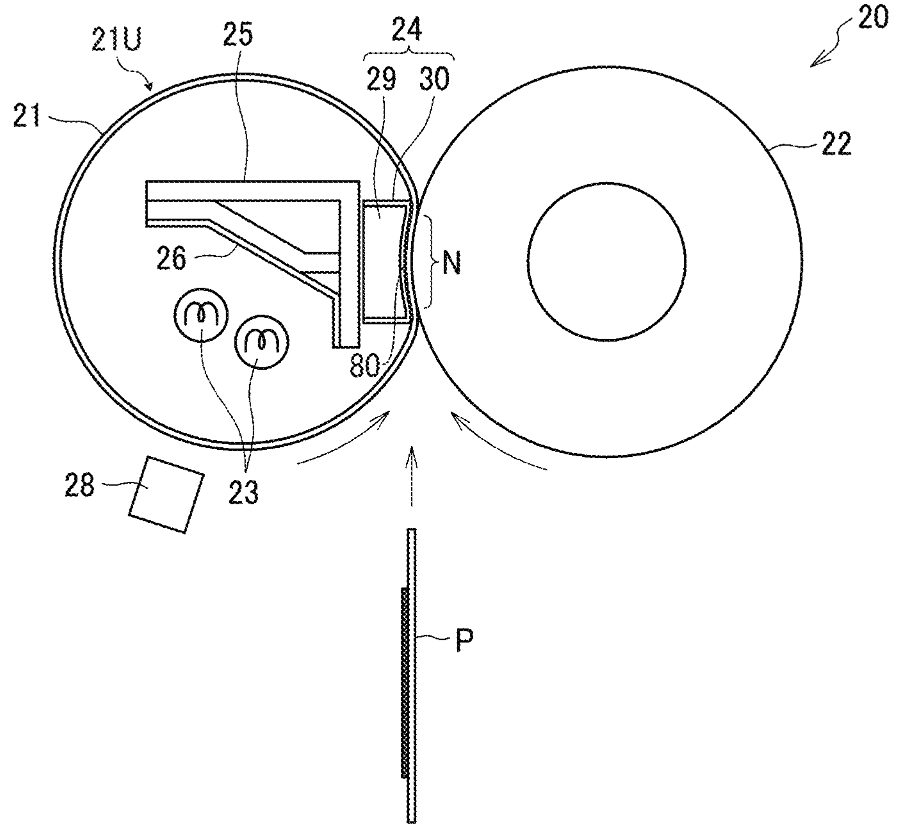
FIG. 2 is a cross-sectional view of a central portion of a fixing device according to a first embodiment of the present disclosure.
Figure 3:
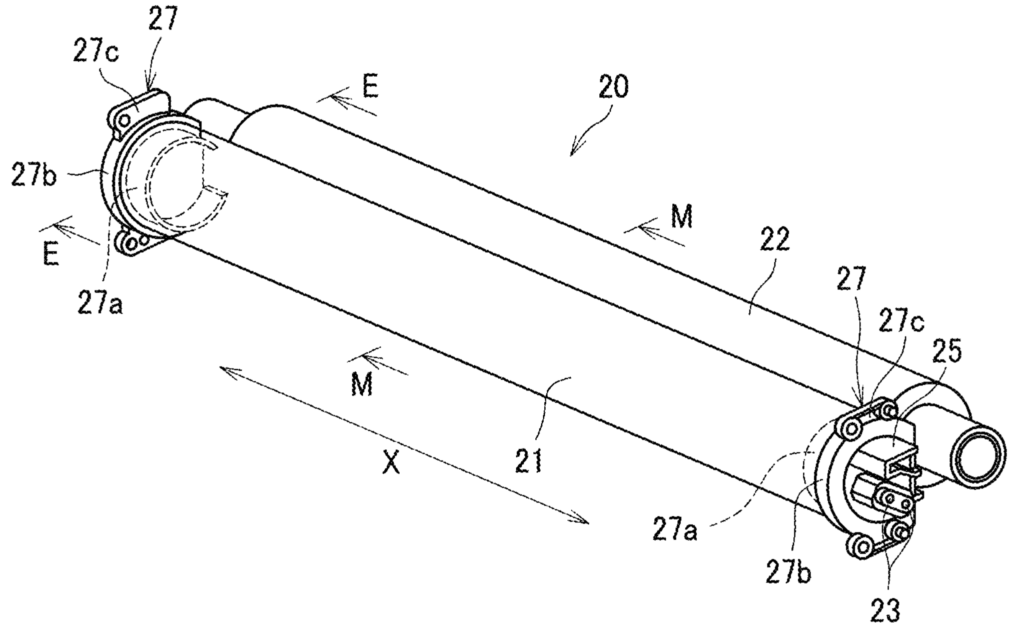
FIG. 3 is a perspective view of the fixing device of FIG. 2.
Figure 4:
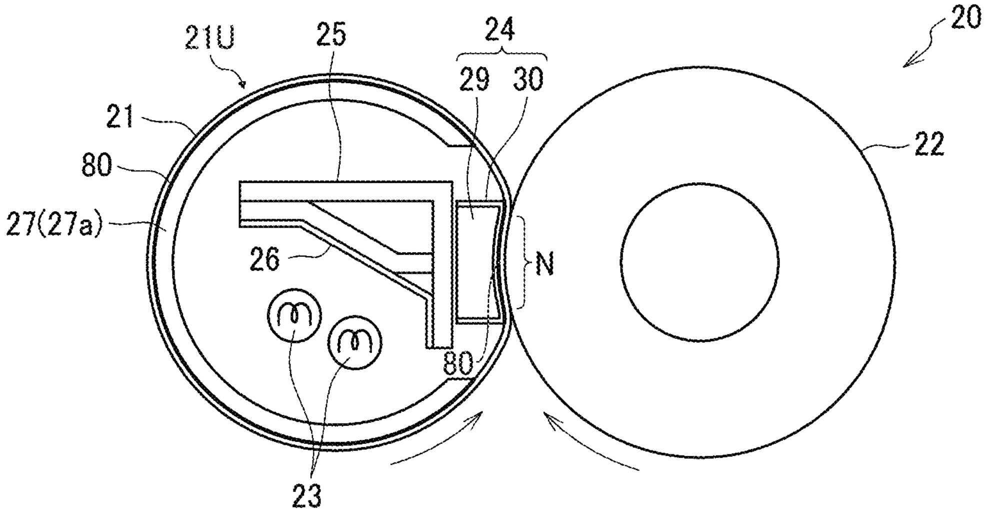
FIG. 4 is a cross-sectional view of an end portion of the fixing device of FIG. 2.

Referring now to FIGS. 2 to 4, a description is given of a basic configuration of the fixing device 20 according to the present embodiment.

FIG. 2 is a cross-sectional view of a central portion of the fixing device 20, taken at a longitudinal center portion M of the fixing belt 21 illustrated in FIG. 3.

FIG. 3 is a perspective view of the fixing device 20.

FIG. 4 is a cross-sectional view of an end portion of the fixing device 20, taken at a longitudinal end portion E of the fixing belt 21 illustrated in FIG. 3.

The above-described "longitudinal direction" of the fixing belt 21 is a direction indicated by two-headed arrow X in FIG. 3, along an axial direction of the pressure roller 22 or a width direction of the sheet P passing through the fixing nip between the fixing belt 21 and the pressure roller 22. The width direction of the sheet P is a direction intersecting a sheet conveyance direction in which the sheet P is conveyed. In the following direction, the longitudinal direction of the fixing belt 21 may be referred to as a longitudinal direction X. "Longitudinal direction" in the following description also has the same meaning.

As illustrated in FIGS. 2 and 4, the fixing device 20 according to the present embodiment includes heaters 23, a nip formation pad 24, a stay 25, a reflector 26 (see FIG. 2), belt holders 27 (see FIGS. 3 and 4), and a temperature sensor 28 (see FIG. 2), in addition to the fixing belt 21 and the pressure roller 22 described above. The fixing belt 21 and the components disposed inside a loop formed by the fixing belt 21 constitute a belt unit 21U, which is detachably coupled to the pressure roller 22.

The fixing belt 21 is a rotator (specifically, a first rotator or a fixing rotator) that contacts an unfixed-toner bearing face of the sheet P bearing the unfixed toner to fix the unfixed toner or unfixed image onto the sheet P.

Specifically, the fixing belt 21 is an endless belt constructed of a base, an elastic layer, and a release layer laminated in this order from an inner circumferential surface to an outer circumferential surface of the fixing belt 21. The base has a thickness of 30 μm to 50 μm and is made of a metal material such as nickel or stainless steel or a resin material such as polyimide. The elastic layer has a thickness of 100 μm to 300 μm and is made of a rubber material such as silicone rubber, silicone rubber form, or fluorine rubber. The elastic layer of the fixing belt 21 eliminates slight surface asperities of the fixing belt 21 at the fixing nip, thus facilitating uniform conduction of heat to the toner image on the sheet P. The release layer of the fixing belt 21 has a thickness of 10 μm to 50 μm and is made of, for example, tetrafluoroethylene-perfluoroalkylvinylether copolymer (PFA), polytetrafluoroethylene (PTFE), polyimide, polyetherimide, or polyether sulfide (PES). The release layer of the fixing belt 21 facilitates the separation of toner contained in the toner image on the sheet P from the fixing belt 21. In other words, the release layer of the fixing belt 21 facilitates the release of the toner from the fixing belt 21. To reduce the size and thermal capacity of the fixing belt 21, the fixing belt 21 preferably has a total thickness equal to or less than 1 mm and a loop diameter equal to or less than 30 mm.

The pressure roller 22 is a rotator (specifically, a second rotator or counter rotator) disposed to face the outer circumferential surface of the fixing belt 21.

Specifically, the pressure roller 22 includes a solid iron core, an elastic layer resting on an outer circumferential surface of the core, and a release layer resting on an outer circumferential surface of the elastic layer. The core may be hollow. The elastic layer is made of, for example, silicone rubber, silicone rubber form, or fluorine rubber. The release layer is made of a fluororesin such as PFA or PTFE.

The heater 23 is a heating source that heats the fixing belt 21. In the present embodiment, a halogen heater is used as the heater 23. Instead of the halogen heater, the heater 23 may be another radiant heater such as a carbon heater or a ceramic heater. In the present embodiment, the two heaters 23 are disposed inside the loop formed by the fixing belt 21. However, the number of the heaters 23 is not limited to two. Alternatively, a single heater 23 may be disposed. Alternatively, three or more heaters 23 may be disposed.

The nip formation pad 24 is disposed inside the loop formed by the fixing belt 21. The nip formation pad 24 forms a nip N between the fixing belt 21 and the pressure roller 22 under pressure from the pressure roller 22. The nip formation pad 24 includes a base pad 29 and a sliding sheet 30.

The base pad 29 is continuously disposed in the longitudinal direction X of the fixing belt 21 and fixed to the stay 25. The shape of the nip N is determined by the base pad 29 under pressure from the pressure roller 22. The base pad 29 is preferably made of a heat-resistant material having a heat-resistant temperature of not less than 200° C. For example, the base pad 29 is made of a typical heat-resistant resin such as polyether sulfone (PES), polyphenylene sulfide (PPS), liquid crystal polymer (LCP), polyether nitrile (PEN), polyamide-imide (PAI), and polyether ether ketone (PEEK). The base pad 29 made of such a heat-resistant material prevents the thermal deformation of the base pad 29 in a fixing temperature range and stabilizes the shape of the nip N. Although FIG. 2 illustrates the nip N having a concave shape, the nip N may be flat or have another shape.

The sliding sheet 30 is a low-friction sheet interposed between the base pad 29 and the inner circumferential surface of the fixing belt 21. The sliding sheet 30 that is interposed between the base pad 29 and the fixing belt 21 reduces the sliding resistance of the fixing belt 21 against the base pad 29. In a case where the base pad 29 is a low-friction pad, the sliding sheet 30 may be omitted.

The stay 25 is a support that supports the nip formation pad 24 toward the pressure roller 22. The stay 25 supporting the nip formation pad 24 prevents the bending of the nip formation pad 24 (in particular, bending throughout the length of the fixing belt 21) under pressure from the pressure roller 22. Thus, the nip N having a uniform width is obtained. The stay 25 is preferably made of an iron-based metal material such as steel use stainless (SUS) or steel electrolytic cold commercial (SECC) to enhance the rigidity.

The reflector 26 reflects radiant heat (infrared rays) emitted from the heaters 23.

The reflector 26 reflects, to the fixing belt 21, the radiant heat emitted from the heaters 23 to efficiently heat the fixing belt 21. As the reflector 26 is interposed between the stay 25 and the heaters 23, the reflector 26 also prevents heat conduction to the stay 25. The reflector 26 thus prevents the flow of heat to a component that does not directly contribute to fixing, to enhance the efficiency of energy consumption. The reflector 26 is made of, for example, a metal material such as aluminum or stainless steel. In particular, in a case where the reflector 26 includes an aluminum base having a surface on which silver having a relatively high reflectance is deposited, the heating efficiency is further enhanced.

The belt holders 27 are a pair of rotator holders that holds the fixing belt 21 such that the fixing belt 21 can rotate. In other words, the fixing belt 21 is rotatably held by the belt holders 27. As illustrated in FIG. 3, the belt holders 27 are inserted into the loop formed by the fixing belt 21 at opposed longitudinal end portions of the fixing belt 21 to hold the fixing belt 21 from inside such that the fixing belt 21 can rotate. The "opposed longitudinal end portions" of the fixing belt 21 described above are not limited to opposed longitudinal edges of the fixing belt 21, which are the most ends in the longitudinal direction of the fixing belt 21. Similarly, a "longitudinal end portion" of the fixing belt 21 in the following description is not limited to a longitudinal edge of the fixing belt 21, which is the most end in the longitudinal direction of the fixing belt 21. Each of the "opposed longitudinal end portions" and the "longitudinal end portion" includes, besides the longitudinal edge of the fixing belt 21, a position within a range of one-third length from the longitudinal edge when the fixing belt 21 is equally divided into three in the longitudinal direction of the fixing belt 21. In other words, the belt holder 27 may hold, as the longitudinal end portion of the fixing belt 21, an area including the longitudinal edge of the fixing belt 21 or an area not including the longitudinal edge of the fixing belt 21.

Specifically, the belt holder 27 includes an insertion 27*a*, a restraint 27*b*, and a fixed portion 27*c*. The insertion 27*a* has a C-shaped cross-section and is inserted into the longitudinal end portion of the fixing belt 21. The restraint 27*b* has an outer diameter greater than that of the insertion 27*a*. The fixed portion 27*c* is fixed to a side plate 33 illustrated in FIG. 5. The restraint 27*b* has an outer diameter greater than that of at least the fixing belt 21 to restrain the deviation or movement of the fixing belt 21 in the longitudinal direction X. The insertion 27*a* is inserted into the longitudinal end portion of the fixing belt 21 to hold the fixing belt 21 from inside such that the fixing belt 21 can rotate.

The temperature sensor 28 is a temperature detector that detects the temperature of the fixing belt 21. In the present embodiment, the temperature sensor 28 is a non-contact temperature sensor that is disposed so as not to contact the outer circumferential surface of the fixing belt 21. In this case, the temperature sensor 28 detects the ambient temperature near the outer circumferential surface of the fixing belt 21 as the surface temperature of the fixing belt 21. The temperature sensor 28 is not limited to a non-contact sensor. Alternatively, the temperature sensor 28 may be a contact sensor that contacts the fixing belt 21 to detect the surface temperature of the fixing belt 21. The temperature sensor 28 may be, for example, a thermopile, a thermostat, a thermistor, or a normally closed (NC) sensor.

The fixing device 20 according to the present embodiment operates as follows.

As the pressure roller 22 is rotated in a direction indicated by an arrow in FIG. 2 by driving of a driving source disposed in the body of the image forming apparatus 100, the fixing belt 21 is rotated by the rotation of the pressure roller 22. The heaters 23 generate heat to heat the fixing belt 21. At this time, the amount of heat to be generated by the heaters 23 is controlled based on the temperature of the fixing belt 21 detected by the temperature sensor 28 to achieve a given fixing temperature of the fixing belt 21 at which an image can be fixed. When the temperature of the fixing belt 21 reaches the fixing temperature and the sheet P bearing an unfixed image reaches the nip N between the fixing belt 21 and the pressure roller 22, the fixing belt 21 and the pressure roller 22 apply heat and pressure to the sheet P to fix the image onto the sheet P.

In a fixing device including a nip formation pad such as the nip formation pad 24 described above, when a fixing belt rotates, the fixing belt slides over the nip formation pad and generates sliding resistance between the fixing belt and the nip formation pad. To reduce such sliding resistance, a lubricant such as silicone oil or fluorine grease is typically applied so as to be interposed between the fixing belt and the nip formation pad. For example, in the present embodiment, a lubricant 80 is contained in the sliding sheet 30 disposed between the base pad 29 of the nip formation pad 24 and the inner circumferential surface of the fixing belt 21 as illustrated in FIG. 2. As the lubricant 80 oozes out from the sliding sheet 30, the lubricant 80 is interposed between the nip formation pad 24 and the fixing belt 21.

In the configuration in which the fixing belt 21 is held by the pair of belt holders 27 as described above, when the fixing belt 21 rotates, the fixing belt 21 slides over each of the belt holders 27. At this time, the sliding resistance is also generated between each of the belt holders 27 and the fixing belt 21. To reduce the sliding resistance, the lubricant 80 as described above is also interposed between each of the belt holders 27 and the fixing belt 21 as illustrated in FIG. 4.

In a configuration including slide aids such as the nip formation pad and the belt holders over which the fixing belt slides, a lubricant such as silicone oil or fluorine grease is typically used to enhance the slidability of the fixing belt. However, when some components of the lubricant are volatilized with an increase in the temperature of the fixing device and aggregated by being cooled in the atmosphere, fine particles (FP) and ultrafine particles (UFP) are generated and may be released from the fixing device. In the following description, the fine particles and the ultrafine particles may be referred to simply as FP/UFP.

Currently, due to an increase in the awareness of environmental issues, the reduction of FP/UFP discharged from products has been desired. The image forming apparatuses that reduce the generation of FP/UFP are also to be developed.

Figure 18:
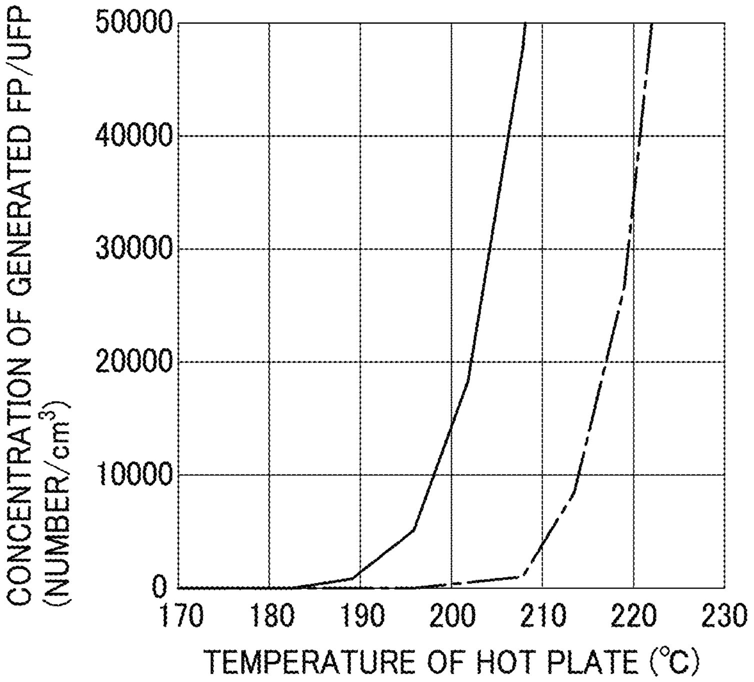
FIG. 18 is a graph illustrating an example relation between the temperature of a lubricant and the concentration of generated fine particles and ultrafine particles.

In view of the above, to consider how to reduce the generation of FP/UFP from the fixing devices, the inventors conducted a test to examine the relation between the temperature rise of silicone oil and fluorine grease used as lubricants and the concentration of FP/UFP generated from the lubricants (the number of FP/UFP generated per 1 $cm^3$). FIG. 18 illustrates the results.

This test was performed in a test apparatus (a chamber having a volume of 1 $m^3$ and a ventilating frequency of 5 times) installed in a laboratory certified by the German environmental label "Blue Angel." Specifically, a dish containing a lubricant was placed on a hot plate and heated to 250° C. While the temperature of the hot plate was monitored, the concentration of generated FP/UFP having a diameter of 5.6 nm to 560 nm specified by the Blue Angel standard was measured. The concentration of generated FP/UFP was measured with a particle sizer (Model 3091 FAST MOBILITY PARTICLE SIZER (FMPS), Tokyo Dylec Corp.). A fluorine grease of 70 mg and a silicone oil of 35 mg were used as lubricants. In FIG. 18, the solid line indicates the concentration of FP/UFP generated from the fluorine grease, whereas the alternate long and short dash line indicates the concentration of FP/UFP generated from the silicone oil. In FIG. 18, the horizontal axis indicates the temperature of the hot plate. Since the temperature rise of the hot plate and the temperature rise of the lubricant change substantially in synchronization with each other, the temperature of the hot plate is regarded as the temperature of the lubricant here.

As indicated by the solid line in FIG. 18, the generation of FP/UFP from the fluorine grease started when the temperature reached about 185° C. The concentration of FP/UFP generated from the fluorine grease started rapidly increasing when the temperature exceeded about 195° C. On the other hand, as indicated by the alternate long and short dash line in FIG. 18, the generation of FP/UFP from the silicone oil started when the temperature reached about 200° C. The concentration of FP/UFP generated from the silicone oil started rapidly increasing when the temperature exceeded about 210° C.

As described above, since the FP/UFP are generated from the fluorine grease and the silicone oil when the temperature reaches 185° C. and 200° C., respectively, the FP/UFP may be generated from the lubricant in the fixing device in which the temperature can exceed 200° C. To effectively reduce such FP/UFP, a temperature rise in a portion of the fixing device where FP/UFP are likely to be generated is to be prevented.

However, the portion of the fixing device from which the FP/UFP are mostly generated has not been specified. For this reason, the inventors have conducted intensive studies on a main source that generates the FP/UFP. As a result, the inventors have found that a large amount of FP/UFP is generated mainly from the lubricant adhering to the belt holder. A description is now given of the mechanism of generation of FP/UFP and the reason why a large amount of FP/UFP is generated mainly from the lubricant adhering to the belt holder.

Figure 19:
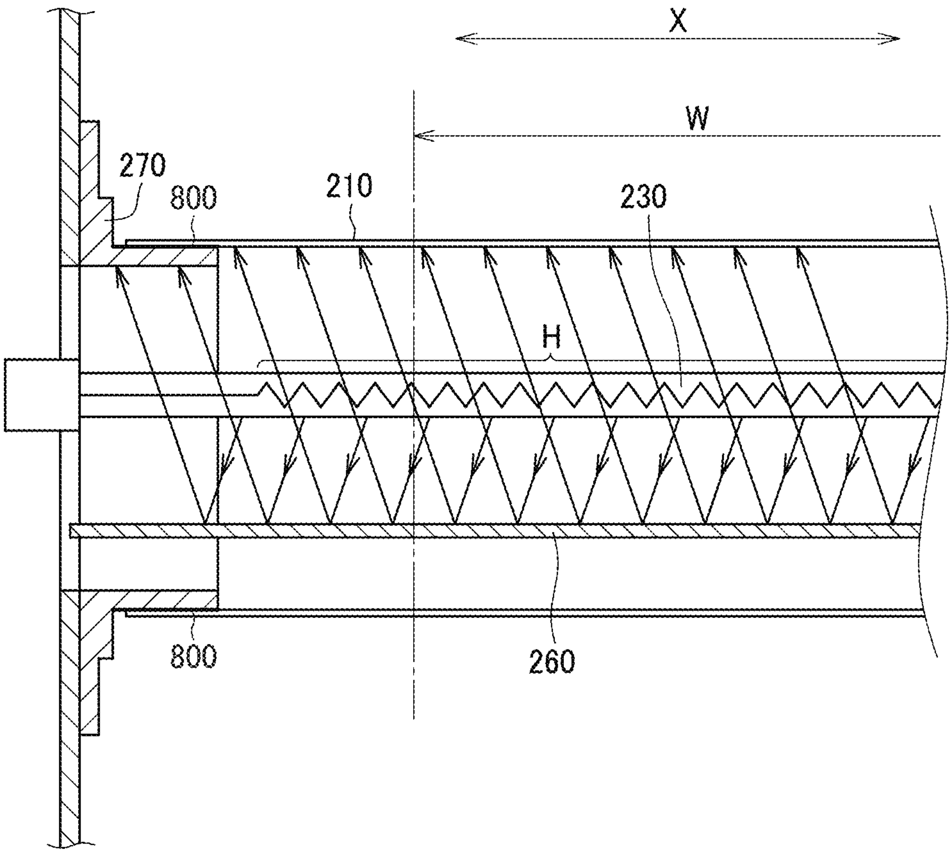
FIG. 19 RELATED ART
FIG. 19 is a cross-sectional view of an end portion of a fixing device according to a comparative example, taken along a longitudinal direction of a fixing belt included in the fixing device.

FIG. 19 is a cross-sectional view of an end portion of a fixing device according to a comparative example, taken along the longitudinal direction X of a fixing belt 210 included in the fixing device.

As illustrated in FIG. 19, the fixing device according to the comparative example includes a belt holder 270 that holds a longitudinal end portion of the fixing belt 210, like the fixing device according to the embodiment described above. Inside the fixing belt 210, a reflector 260 is disposed to reflect radiant heat emitted from a heater 230. As illustrated in FIG. 19, the heater 230 includes a heat-generating portion H in which a heat generator such as a filament is disposed to emit radiant heat. FIG. 19 schematically illustrates, by arrows, radiant heat (infrared rays) reflected by the reflector 260. As illustrated in FIG. 19, an inner circumferential surface of the fixing belt 210 is irradiated with most of the radiant heat reflected by the reflector 260. On the other hand, an inner circumferential surface of the belt holder 270 is irradiated with a part of the radiant heat reflected by the reflector 260. Thus, the belt holder 270 is heated and the temperature of the belt holder 270 rises. In particular, when multiple sheets are continuously conveyed, the temperature rise is remarkable at opposed longitudinal end portions of the fixing belt 210 because the opposed longitudinal end portions of the fixing belt 210 are non-conveyance areas of the fixing belt 210 in which no sheet is conveyed. For this reason, the temperature of the belt holder 270 that holds each of the opposed longitudinal end portions of the fixing belt 210 is also likely to rise under the influence of the heat of the fixing belt 210. In the configuration as illustrated in FIG. 19 in which the heat-generating portion H of the heater 230 is extended to the outside of a maximum sheet conveyance area W as a maximum recording-medium conveyance area in which a sheet serving as a recording medium having a maximum width is conveyable, the temperature rise of the fixing belt 210 in a non-conveyance area outside the maximum sheet conveyance area W is more remarkable. Relatedly, the temperature rise of the belt holder 270 also tends to be remarkable.

A lubricant 800 is applied on an outer circumferential surface of the belt holder 270 to reduce the sliding resistance of the fixing belt 210. In a case where the lubricant 800 is not actively applied on the outer circumferential surface of the belt holder 270, a lubricant interposed between the fixing belt 210 and a nip formation pad may flow with the rotation of the fixing belt 210 and adhere to the outer circumferential surface of the belt holder 270.

When the temperature of the belt holder 270 rises and exceeds the temperature at which the FP/UFP are generated, due to the influence of reflection of radiant heat by the reflector 260, in addition to the influence of the temperature rise at the opposed longitudinal end portions of the fixing belt 210 as described above, some low-molecular-weight components of the lubricant 800 adhering to the belt holder 270 are volatilized and aggregated when cooled in the atmosphere. Thus, the FP/UFP are released. As described above, in the fixing device according to the comparative example, the reflection of radiant heat by the reflector 260 causes the temperature rise of the belt holder 270, as one of the factors of generating the FP/UFP.

In the embodiments of the present disclosure, the following measures are taken to prevent the temperature rise of the belt holder.

Figure 5:
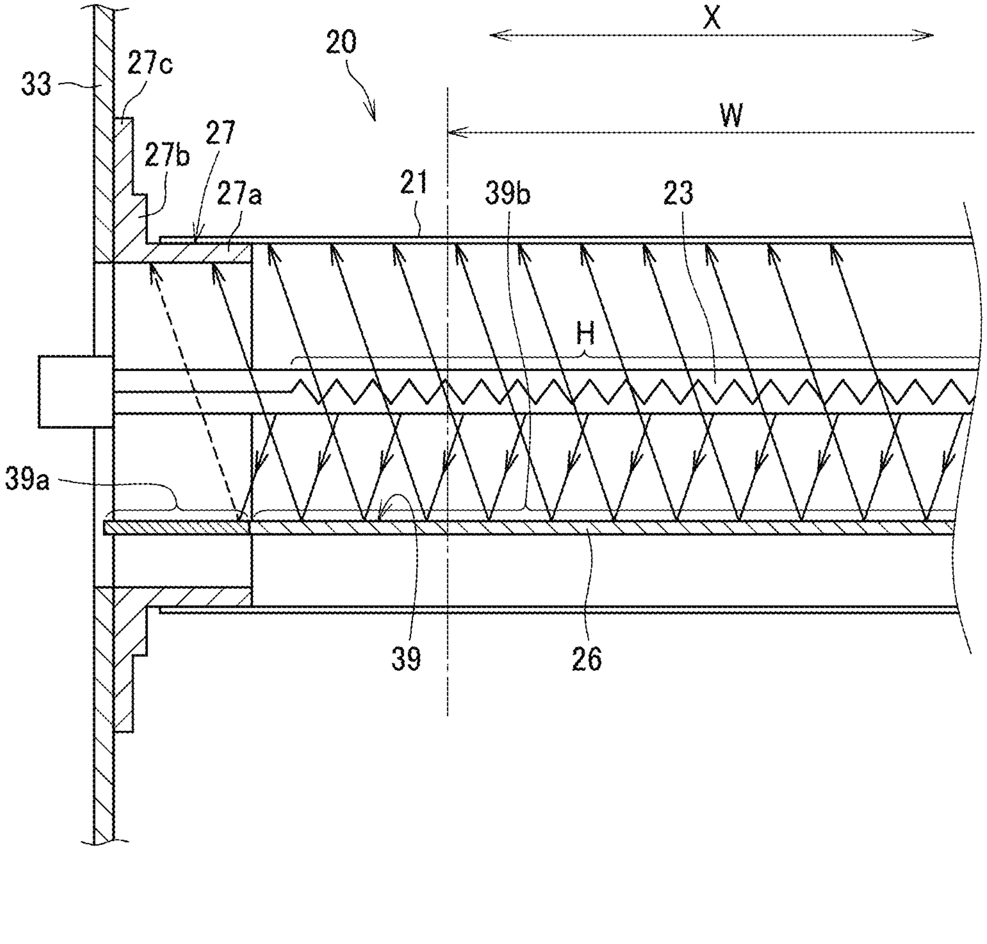
FIG. 5 is a cross-sectional view of an end portion of the fixing device of FIG. 2, taken along a longitudinal direction of a fixing belt included in the fixing device.

FIG. 5 is a cross-sectional view of an end portion of the fixing device 20, taken along the longitudinal direction X of the fixing belt 21.

As illustrated in FIG. 5, in the fixing device 20 according to the present embodiment, the reflector 26 is disposed continuously from one end to the other end in the longitudinal direction X of the fixing belt 21. In FIG. 5, the maximum sheet conveyance area W is a maximum recording-medium conveyance area in which a sheet serving as a recording medium having a maximum width is conveyable. The heater 23 includes the heat-generating portion H in which a heat generator such as a filament is disposed to emit radiant heat. In the present embodiment, the heat-generating portion H of the heater 23 is disposed over a range greater than the maximum sheet conveyance area W. The reflector 26 is disposed over a range greater than the heat-generating portion H of the heater 23. In this configuration, when radiant heat is emitted from the heater 23, the inner circumferential surface of the belt holders 27 is irradiated with a part of the radiant heat reflected by the reflector 26.

In the present embodiment, a reflection face 39 of the reflector 26 that reflects the radiant heat has different reflectances. Specifically, the reflectance at an end portion 39*a* of the reflection face 39 in the longitudinal direction X of the fixing belt 21 is lower than the reflectance at a center portion 39*b* of the reflection face 39 in the longitudinal direction X of the fixing belt 21. Although FIG. 5 illustrates only one end portion of the reflector 26 in the longitudinal direction X of the fixing belt 21, the reflectance at the other end portion 39*a* (i.e., at the other end portion of the reflector 26) is also lower than the reflectance at the center portion 39*b*.

Now, a description is given of the configuration and operation at the opposed end portions of the reflection face 39 by taking one of the end portions 39*a* as an example.

In the present embodiment, as an example, the reflectance at the center portion 39*b* is equal to or greater than 0.8 whereas the reflectance at each of the end portions 39*a* is equal to or less than 0.3.

As described above, in the present embodiment, the reflectance at the end portion 39*a* of reflection face 39 is lower than the reflectance at the center portion 39*b* of the reflection face 39. Accordingly, the radiant heat reflected from the end portion 39*a* is less than the radiant heat reflected from the center portion 39*b*. FIG. 5 schematically illustrates, by the dotted arrow, the radiant heat reflected from the end portion 39*a* with a smaller amount than the amount of radiant heat reflected from the center portion 39*b* that is indicated by the solid arrows. Such a configuration reduces the radiant heat emitted to the inner circumferential surface of the belt holder 27 and the temperature rise of the belt holder 27.

The end portion 39*a* (or each of the opposed end portions 39*a*) of the reflection face 39 refers to a position included within a range of one-third length from the most end (i.e., edge) of the reflection face 39 when the reflection face 39 is equally divided into three in the longitudinal direction X of the fixing belt 21. In other words, the portion having a reflectance lower than the reflectance of the center portion 39*b* may be a portion including the most end (i.e., edge) of the reflection face 39 in the longitudinal direction X of the fixing belt 21 or may be a portion not including the edge of the reflection face 39. On the other hand, the center portion 39*b* of the reflection face 39 refers to a position closer to the longitudinal center portion M of the fixing belt 21 illustrated in FIG. 3 than the end portion 39*a* of the reflection face 39. In other words, the center portion 39*b* of the reflection face 39 may be the entire area between the opposed end portions 39*a* or may be a part of the entire area between the opposed end portions 39*a*.

In particular, in the present embodiment illustrated in FIG. 5, the temperature rise of the belt holder 27 is effectively reduced because the end portion 39*a* having a relatively low reflectance is disposed at least at a position where the belt holder 27 is disposed (specifically, a position where the end portion 39*a* faces the belt holder 27) in the longitudinal direction X of the fixing belt 21. In other words, since the reflection face 39 of the reflector 26 has a relatively low reflectance at a portion mainly reflecting the radiant heat toward the belt holder 27, the radiant heat emitted to the belt holder 27 is effectively reduced. Accordingly, the temperature rise of the belt holder 27 is effectively reduced.

The end portion 39*a* having a relatively low reflectance may or may not be disposed at the position where the belt holder 27 is disposed in the longitudinal direction X of the fixing belt 21. Since the radiant heat that is emitted from the heater 23 is diffused in various directions, the inner circumferential surface of the belt holder 27 may be irradiated with the radiant heat reflected by the reflector 26 that is offset from the belt holder 27 in the longitudinal direction X. For this reason, even in a case where the reflector 26 is offset from the belt holder 27 in the longitudinal direction X, the end portion 39*a* having a relatively low reflectance reduces the reflection of radiant heat toward the belt holder 27 and contributes to the reduction of the temperature rise of the belt holder 27.

Figure 6:
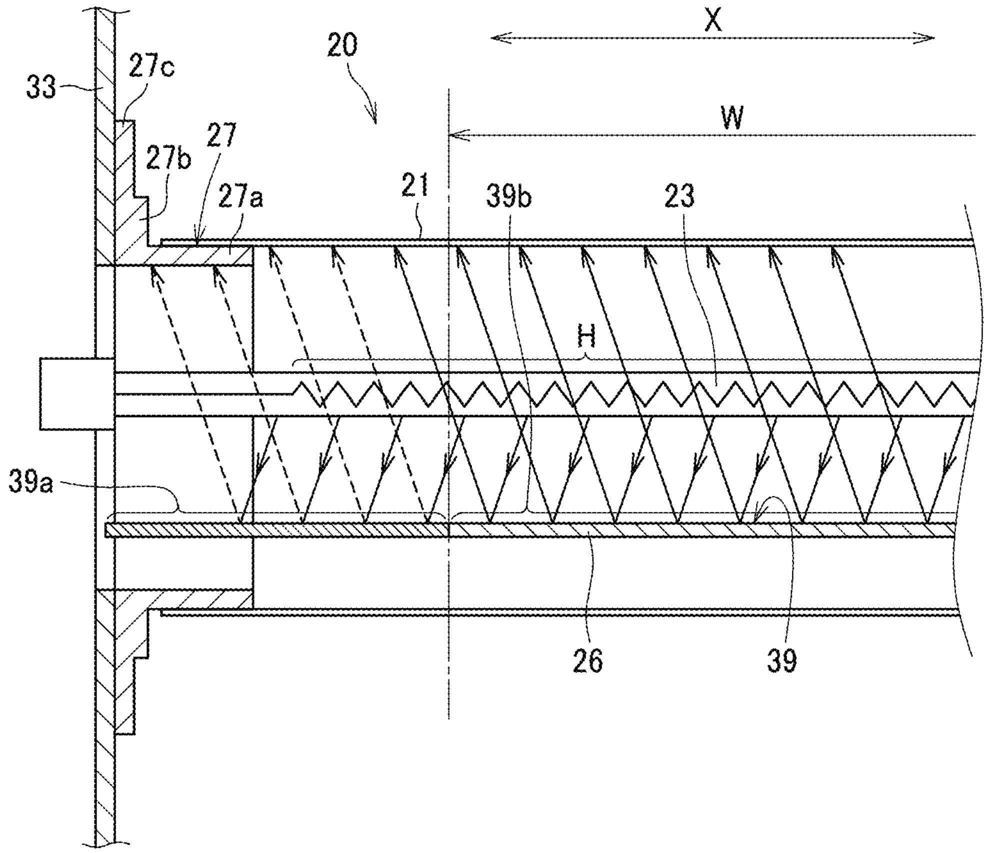
FIG. 6 is a diagram illustrating a reflector including a low-reflectance portion disposed over an entire non-conveyance area of a reflector.

In the example illustrated in FIG. 5, the end portion 39*a* having a relatively low reflectance is disposed in a part of the non-sheet conveyance area of the reflector 26 outside the maximum sheet conveyance area W. Alternatively, the end portion 39*a* having a relatively low reflectance may be disposed over the entire non-sheet conveyance area of the reflector 26 as in the example illustrated in FIG. 6. The change in reflectance between the end portion 39*a* as a low-reflectance portion having a relatively low reflectance and the center portion 39*b* as a high-reflectance portion having a relatively high reflectance is not limited to a binary (sudden) change and may be a continuous or stepwise change.

Figure 8:
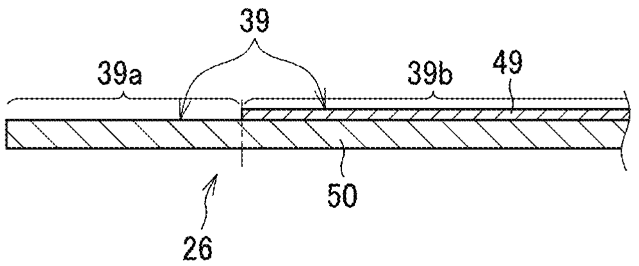
FIG. 8 is a diagram illustrating an example reflector including portions with different reflectances.

The reflection face 39 has different reflectances between the end portion 39*a* and the center portion 39*b* in a case where the reflection face 39 is made of different materials between the end portion 39*a* and the center portion 39*b*. For example, as illustrated in FIG. 8, the reflector 26 may include a base 50 made of aluminum and a surface layer 49 on the base 50 at the center portion 39*b*. The surface layer

49 is a silver vapor-deposition layer containing silver having a relatively high reflectance. In this case, since the surface layer 49 having a relatively high reflectance is not disposed on the base 50 at the end portion 39*a*, the reflectance at the end portion 39*a* is lower than the reflectance at the center portion 39*b*.

Figure 9:
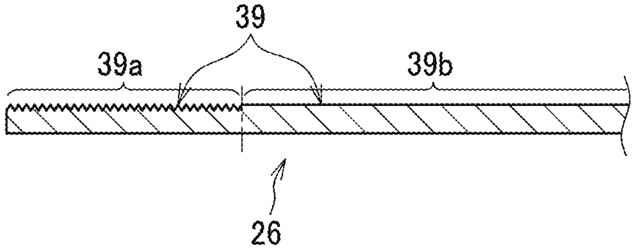
FIG. 9 is a diagram illustrating another example reflector including portions with different reflectances.

Alternatively, as illustrated in FIG. 9, the surface roughness at the end portion 39*a* of the reflection face 39 may be greater than the surface roughness at the center portion 39*b* of the reflection face 39 so that the reflectance of the reflection face 39 is lower at the end portion 39*a* than at the center portion 39*b*. For example, the surface roughness at the end portion 39*a* is 10 times or more the surface roughness at the center portion 39*b*. In the configuration illustrated in FIG. 8 in which the surface layer 49 is disposed only at the center portion 39*b*, the surface roughness at the end portion 39*a* may be greater than the surface roughness at the center portion 39*b*. The roughness is specified by an arithmetic average roughness Ra measured with a non-contact roughness and confocal laser microscope (VK3000 manufactured by Keyence Corporation).

The reflectance of the reflection face herein refers to a reflectance measured at an incident angle of 5° with a spectrophotometer (ultraviolet-visible infrared spectrophotometer UH4150 manufactured by Hitachi High-Tech Science Corporation).

Figure 7:
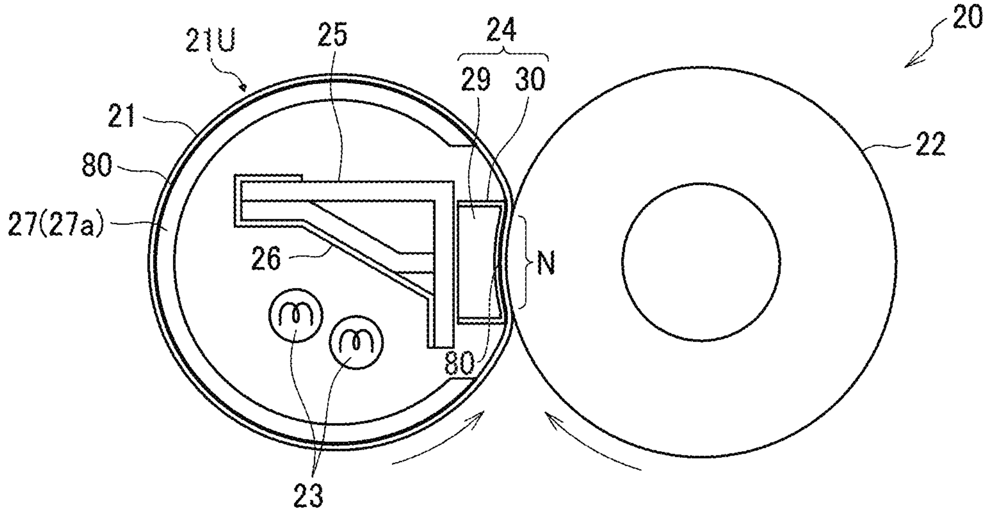
FIG. 7 is a diagram illustrating an increased area of contact between a reflector and a stay.

As described above, in the present embodiment, the reflectance at the end portion 39*a* of the reflector 26 is decreased to reduce the radiant heat reflected to the belt holder 27. On the other hand, the amount of heat that is absorbed by the reflector 26 increases. In other words, the temperature of the reflector 26 may easily rise, particularly at the end portion 39*a*. However, in the present embodiment, since the reflector 26 is in contact with the stay 25 illustrated in FIG. 2, the heat of the reflector 26 is released to the stay 25. Accordingly, the temperature rise of the reflector 26 is reduced. In the example illustrated in FIG. 7 in which the reflector 26 is extended to the surface of the stay 25 not facing the heater 23 to increase the contact area between the reflector 26 and the stay 25, the heat conduction from the reflector 26 to the stay 25 is further facilitated. Accordingly, the temperature rise of the reflector 26 is more effectively reduced. Since the heat that is conducted from the reflector 26 to the stay 25 is further conducted from the stay 25 to the fixing belt 21 via the nip formation pad 24, the heat of the reflector 26 is effectively utilized as heating energy for the fixing belt 21.

Now, a description is given of some other embodiments of the present disclosure.

The following describes some features different from the features of the above embodiment, and redundant descriptions of common features are omitted unless otherwise required.

Figure 10:
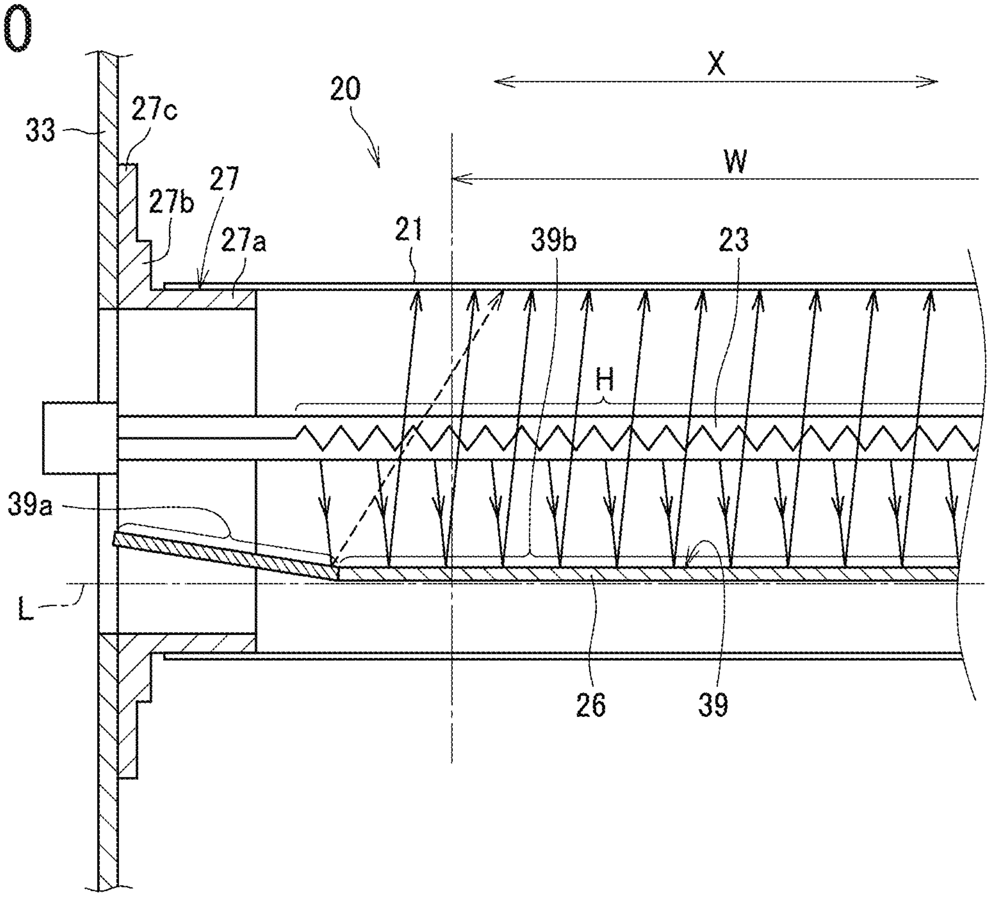
FIG. 10 is a cross-sectional view of an end portion of a fixing device, taken along a longitudinal direction of a fixing belt included in the fixing device according to a second embodiment of the present disclosure.

FIG. 10 is a diagram illustrating a configuration of a fixing device according to a second embodiment of the present disclosure.

As illustrated in FIG. 10, in the fixing device 20 according to the second embodiment, the end portion 39*a* of the reflector 26 is inclined. Specifically, the reflection face 39 at the end portion 39*a* is inclined toward the center portion 39*b* with respect to an axis L extending in the longitudinal direction X of the fixing belt 21. In this configuration, when radiant heat is emitted from the heater 23, the radiant heat is reflected toward the center portion 39*b* from the end portion 39*a* of the reflector 26 as indicated by the dotted arrow in FIG. 10.

As described above, in the second embodiment, the inclined end portion 39*a* of the reflector 26 reflects the radiant heat toward the center portion 39*b* to reduce the radiant heat emitted to the belt holder 27. Like the above embodiment, the reflectance at the end portion 39*a* of the reflector 26 is lower than the reflectance at the center portion 39*b* of the reflector 26 in the present embodiment. Accordingly, the reflection of the radiant heat toward the belt holder 27 is effectively reduced. In short, since the reflectance at the end portion 39*a* is lower than the reflectance at the center portion 39*b* and the radiant heat is reflected toward the center portion 39*b* from the end portion 39*a*, the radiant heat that is reflected toward the belt holder 27 is further reduced in the present embodiment compared with the first embodiment. Thus, the second embodiment more effectively reduces the temperature rise of the belt holder 27 than the first embodiment.

Figure 11:
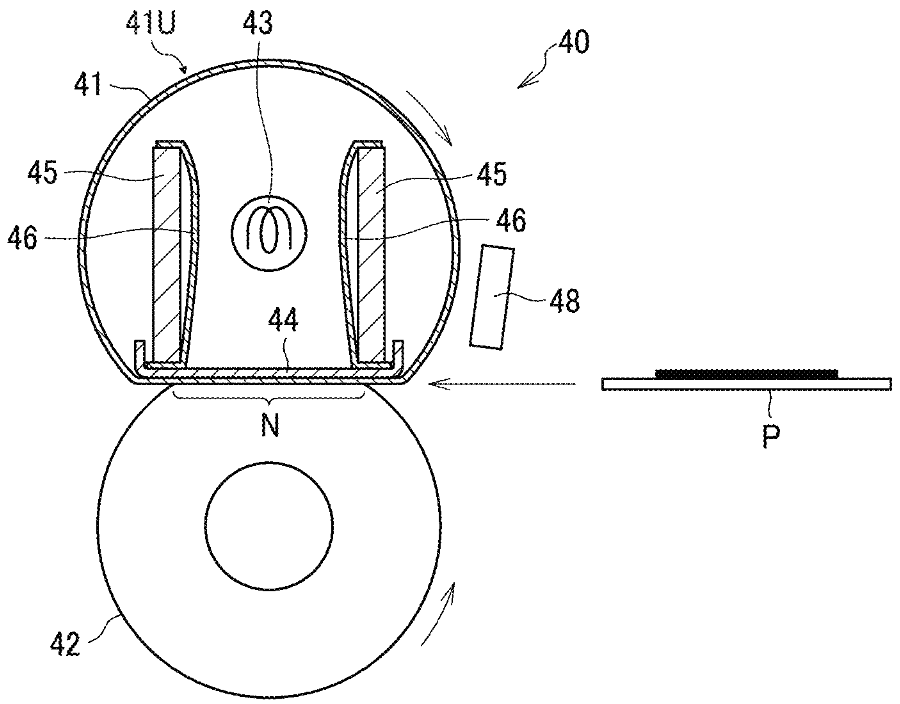
FIG. 11 is a cross-sectional view of a central portion of a fixing device according to a third embodiment of the present disclosure.
Figure 12:
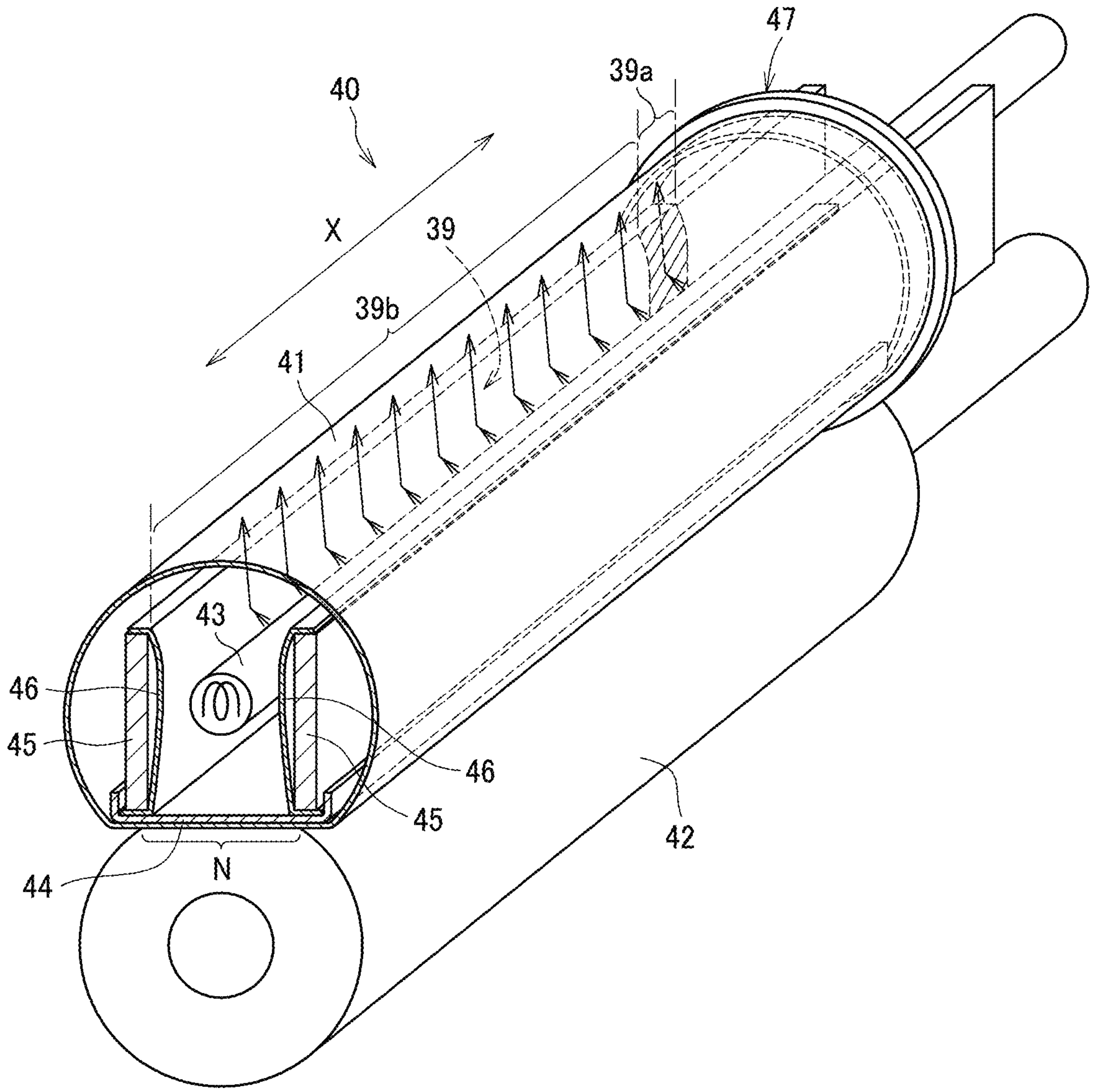
FIG. 12 is a cross-sectional perspective view of the fixing device according to the third embodiment of the present disclosure.

FIGS. 11 and 12 illustrate a configuration of a fixing device according to a third embodiment of the present disclosure.

As illustrated in FIGS. 11 and 12, a fixing device 40 according to the third embodiment includes a fixing belt 41, a pressure roller 42, a heater 43, a nip formation pad 44, stays 45, reflectors 46, belt holders 47 (see FIG. 12), and a temperature sensor 48 (see FIG. 11). The fixing belt 41 and the components disposed inside a loop formed by the fixing belt 41 constitute a belt unit 41U, which is detachably coupled to the pressure roller 42.

The fixing belt 41, the pressure roller 42, the heater 43, the nip formation pad 44, the reflectors 46, the belt holders 47, and the temperature sensor 48 that are illustrated in FIGS. 11 and 12 are basically the same in function as the fixing belt 21, the pressure roller 22, the heater 23, the nip formation pad 24, the reflector 26, the belt holders 27, and the temperature sensor 28, respectively, illustrated in FIGS. 2 to 4.

However, in the third embodiment illustrated in FIGS. 11 and 12, an inner circumferential surface of the fixing belt 41 and the nip formation pad 44 are irradiated with radiant heat emitted from the heater 43. In other words, the fixing belt 41 is heated by the radiant heat emitted from the heater 43 directly toward the fixing belt 41 and the radiant heat indirectly conducted to the fixing belt 41 via the nip formation pad 44. Thus, the nip formation pad 44 that forms the nip N functions as a heat conductor that conducts heat to the fixing belt 41 at the nip N. To conduct heat, the nip formation pad 44 is made of a metal material having good thermal conductivity such as copper or aluminum.

The nip formation pad 44 is supported by a pair of stays 45 disposed so as to sandwich the heater 43. The reflector 46 is disposed between the heater 43 and each of the stays 45. The radiant heat that is emitted from the heater 43 is reflected by the reflectors 46 toward the inner circumferential surface of the fixing belt 41 and the nip formation pad 44.

Like the above embodiments, in the third embodiment, an inner circumferential surface of the belt holder 47 that is illustrated in FIG. 12 is irradiated with a part of the radiant heat reflected by the reflectors 46. For this reason, like the above embodiments, the reflection face 39 of the reflector 46 that reflects the radiant heat has different reflectances in the present embodiment. Specifically, the reflectance at the end portion 39*a* (hatched in FIG. 12) of the reflection face 39 in the longitudinal direction X of the fixing belt 41 is lower than the reflectance at the center portion 39*b* of the reflection face 39 in the longitudinal direction X of the fixing belt 21. Although FIG. 12 illustrates the low-reflectance portion (i.e., hatched portion) only at one end portion 39*a* of the reflector 46, the low-reflectance portion is at each of the opposed end portions of each one of the pair of reflectors 46.

As described above, like the first and second embodiments, the reflectance at the end portion 39*a* is lower than the reflectance at the center portion 39*b* in the third embodiment. Accordingly, the radiant heat reflected from the end portion 39*a* is less than the radiant heat reflected from the center portion 39*b*. Such a configuration reduces the radiant heat emitted to the inner circumferential surface of the belt holder 47 and the temperature rise of the belt holder 47.

As described above, in the fixing devices according to the embodiments of the present disclosure, the reflectance at each end portion of the reflector (reflection face) lower than the reflectance at the center portion of the reflector (reflection face) reduces the temperature rise of the belt holder. Accordingly, the temperature rise of the lubricant adhering to the belt holder is reduced, resulting in the reduction of FP/UFP that are generated when some low-molecular-weight components of the lubricant are volatilized and aggregated by being cooled in the atmosphere.

Specifically, when the temperature of the belt holder during 10 minutes of continuous printing is equal to or lower than 210° C., which is a temperature at which the FP/UFP derived from the silicone oil starts rapidly increasing as indicated by the alternate long and short dash line in the graph of FIG. 18, the generation of FP/UFP from the silicone oil is reduced. To reduce the generation of FP/UFP from the silicone oil more effectively, the temperature of the belt holder during 10 minutes of continuous printing is preferably reduced to 200° C. or lower.

When the temperature of the belt holder during 10 minutes of continuous printing remains equal to or lower than 195° C., which is a temperature at which the FP/UFP derived from the fluorine grease starts rapidly increasing as indicated by the solid line in the graph of FIG. 18, the generation of FP/UFP from the silicone oil and the fluorine grease is reduced. To reduce the generation of FP/UFP from the fluorine grease more effectively, the temperature of the belt holder during 10 minutes of continuous printing is preferably reduced to 185° C. or lower.

The "temperature of the belt holder during 10 minutes of continuous printing" is the temperature of the belt holder measured by the following procedure. In the temperature measurement procedure, first, an image forming apparatus including a fixing device (or heating device) is installed in a measurement room in an environment of 23° C. After the power of the image forming apparatus is turned on to start up the image forming apparatus and the image forming apparatus shifts to an energy-saving state, the door of the measurement room is closed. The printing is instructed after a lapse of time (for example, 60 minutes) during which the measurement room is sufficiently ventilated. Then, the temperature of the belt holder is measured for 10 minutes with the time when the first sheet is ejected as the start of printing.

Figure 13:
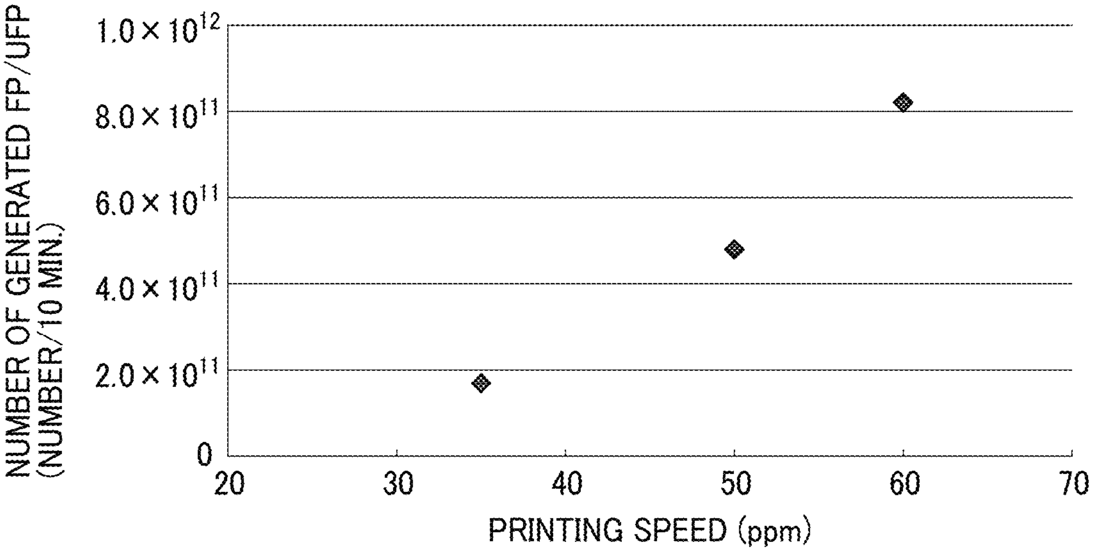
FIG. 13 is a graph illustrating an example relation between the printing speed and the number of generated fine particles and ultrafine particles.

Since the temperature rise of the belt holder as a factor of generating the FP/UFP is more remarkable in the image forming apparatus in which the number of sheets conveyed per unit time is larger, a great effect is expected when the embodiments of the present disclosure are applied particularly to the image forming apparatus in which a large number of sheets can be conveyed. FIG. 13 illustrates an example relation between the printing speed and the number of generated FP/UFP. In FIG. 13, the number of FP/UFP generated from the fixing device during 10 minutes of continuous printing becomes particularly large when the printing speed exceeds 50 pages per minute (ppm). Thus, when the embodiments of the present disclosure are applied to a fixing device or an image forming apparatus having a printing speed equal to or greater than 50 ppm, a greater effect is expected.

Although the fluorine grease and the silicone oil are used as the substances that generate the FP/UFP in the above embodiments, another liquid or semi-solid lubricating substance (i.e., liquid or semi-solid substance having lubricity) besides the fluorine grease and the silicone oil may be used in another embodiment of the present disclosure. In the embodiments of the present disclosure, the lubricating substance (i.e., the substance having lubricity) refers to a substance that is interposed between components to reduce frictional resistance between the components. Even in a case where another liquid or semi-solid lubricating substance besides the fluorine grease and the silicone oil is contained in the fixing device, according to the embodiments of the present disclosure, the temperature rise of the belt holder is reduced while the temperature rise of the lubricating substance adhering to the belt holder is also reduced. Thus, the generation of FP/UFP is effectively reduced.

According to the embodiments of the present disclosure, the configuration of the fixing device is not limited to the configuration described above. The embodiments of the present disclosure can be applied to fixing devices having various configurations. A description is now given of some examples of the configuration of the fixing device to which the embodiments of the present disclosure are applicable.

Figure 14:
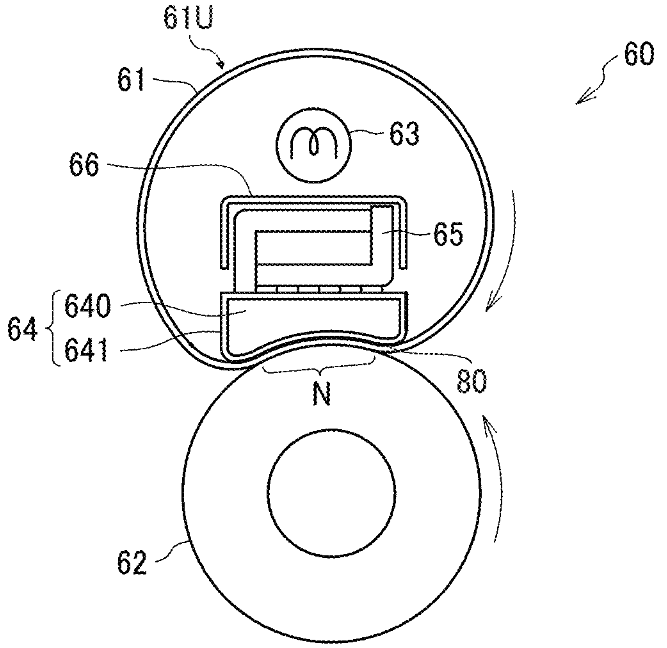
FIG. 14 is a cross-sectional view of a fixing device according to a modification of the above embodiments.
Figure 15:
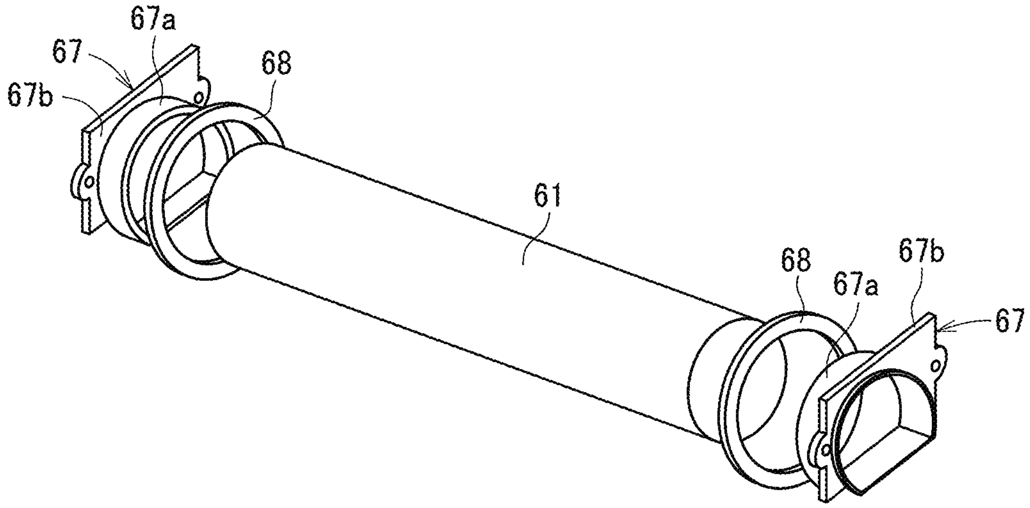
FIG. 15 is an exploded perspective view of the fixing device illustrated in FIG. 14.

A fixing device 60 that is illustrated in FIGS. 14 and 15 is a fixing device including a halogen heater (i.e., a heater 63) as a heating source, like the fixing device 20 illustrated in FIGS. 2 to 4. Specifically, the fixing device 60 that is illustrated in FIGS. 14 and 15 includes a fixing belt 61, a pressure roller 62, the heater 63, a nip formation pad 64, a stay 65, a reflector 66, belt holders 67 (see FIG. 15), and sliding rings 68 (see FIG. 15). The fixing belt 61 and the components disposed inside a loop formed by the fixing belt 61 constitute a belt unit 61U, which is detachably coupled to the pressure roller 62.

The fixing belt 61, the pressure roller 62, the heater 63, the nip formation pad 64, the stay 65, the reflector 66, and the belt holders 67 that are illustrated in FIGS. 14 and 15 are basically the same in function and configuration as the fixing belt 21, the pressure roller 22, the heater 23, the nip formation pad 24, the stay 25, the reflector 26, and the belt holders 27, respectively, illustrated in FIGS. 2 to 4. The nip formation pad 64 includes a metal base pad 640 and a fluororesin sliding sheet 641 that is interposed between the base pad 640 and an inner circumferential surface of the fixing belt 61.

The sliding ring 68 is mounted on an outer circumferential surface of an insertion 67*a* of the belt holder 67, which is inserted into the loop formed by the fixing belt 61. The sliding ring 68 is interposed between a longitudinal edge of the fixing belt 61 and a restraint 67*b* of the belt holder 67. As the fixing belt 61 rotates, the sliding ring 68 rotates together with the fixing belt 61, or the fixing belt 61 slides over the low-friction sliding ring 68. Thus, the sliding resistance that is generated between the fixing belt 61 and the belt holder 67 is reduced.

As described above, the fixing device 60 that is illustrated in FIGS. 14 and 15 includes the reflector 66 to reflect the radiant heat emitted from the heater 63. When the belt holder 67 is irradiated with the radiant heat reflected by the reflector 66, the temperature of the belt holder 67 rises. As a result, some low-molecular-weight components of the lubricant 80 adhering to the belt holder 67 may be volatilized and aggregated when cooled in the atmosphere. Thus, the FP/UFP may be generated. To reduce the generation of FP/UFP, as in the fixing devices described above, the reflectance at each end portion of the reflector 66 (reflection face 39) is preferably lower than the reflectance at the center portion of the reflector 66 (reflection face 39) in the fixing device 60. Such a configuration reduces the radiant heat emitted to the belt holder 67 and the temperature rise of the belt holder 67. Accordingly, the generation of FP/UFP is reduced.

Figure 16:
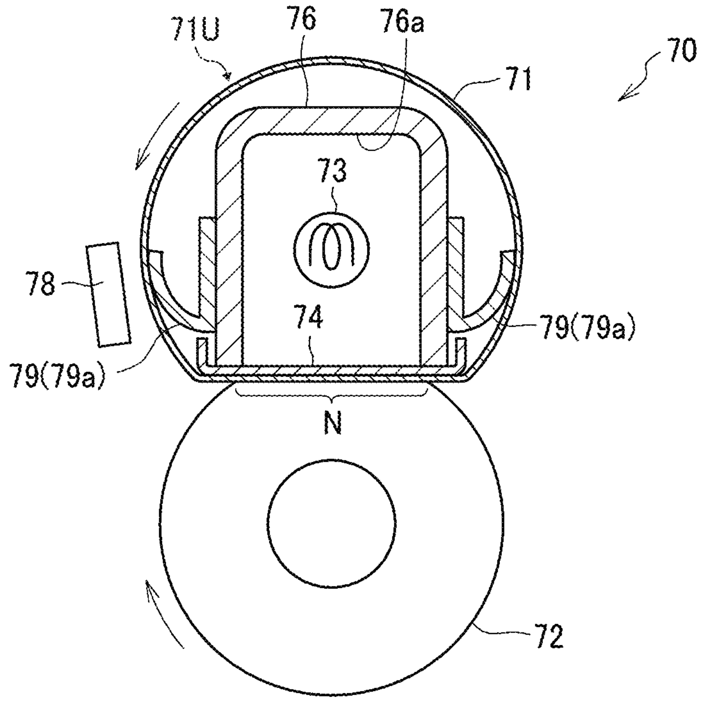
FIG. 16 is a cross-sectional view of a fixing device according to another modification of the above embodiment.
Figure 17:
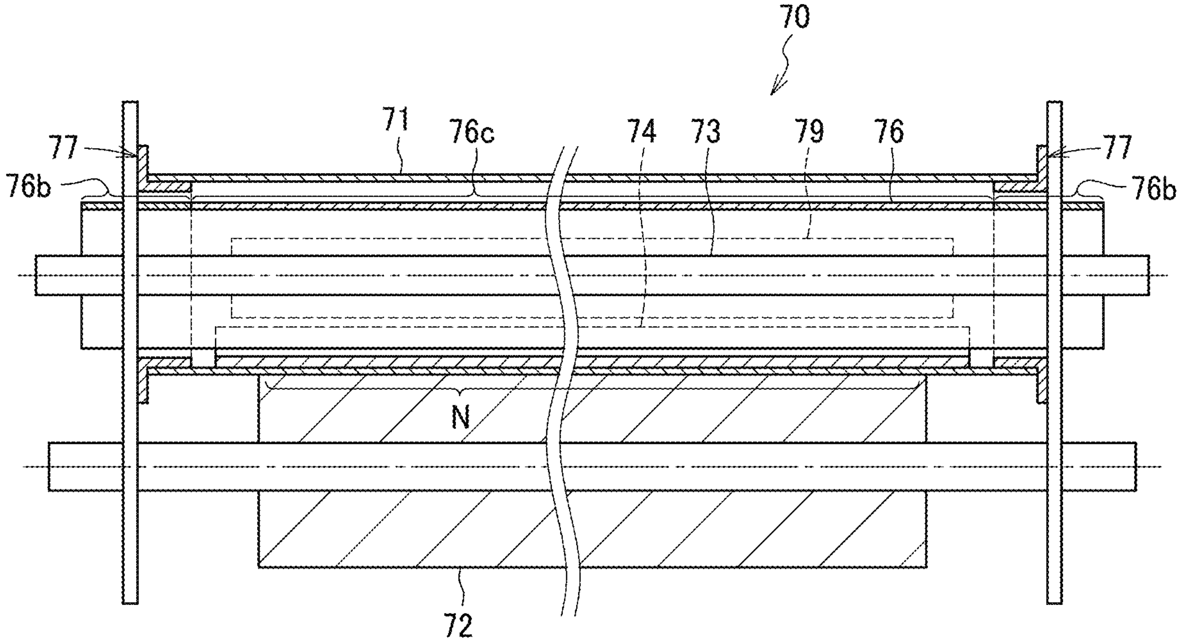
FIG. 17 is a cross-sectional view of the fixing device illustrated in FIG. 16, taken along a longitudinal direction of a fixing belt included in the fixing device.

A fixing device 70 that is illustrated in FIGS. 16 and 17 is a fixing device including a halogen heater (i.e., a heater 73) as a heating source, like the fixing device 20 illustrated in FIGS. 2 to 4. Specifically, the fixing device 70 that is illustrated in FIGS. 16 and 17 includes a fixing belt 71, a pressure roller 72, the heater 73, a nip formation pad 74, a reflector 76, belt holders 77 (see FIG. 17), a temperature sensor 78 (see FIG. 16), and guides 79. The fixing belt 71 and the components disposed inside a loop formed by the fixing belt 71 constitute a belt unit 71U, which is detachably coupled to the pressure roller 72.

The fixing belt 71, the pressure roller 72, the heater 73, the nip formation pad 74, the reflector 76, the belt holders 77, and the temperature sensor 78 that are illustrated in FIGS. 16 and 17 are basically the same in function as the fixing belt 21, the pressure roller 22, the heater 23, the nip formation pad 24, the reflector 26, the belt holders 27, and the temperature sensor 28, respectively, illustrated in FIGS. 2 to 4.

Unlike the reflector 26 that reflects the radiant heat emitted from the heater 23 to the fixing belt 21 in the fixing device 20, the reflector 76 that is illustrated in FIGS. 16 and 17 reflects the radiant heat (infrared rays) emitted from the heater 73 mainly to the nip formation pad 74, not to the fixing belt 71. The reflector 76 has a U-shaped cross-section to cover the outside of the heater 73. The reflector 76 has a reflection face 76*a* as an inner face facing the heater 73 and having a relatively high reflectance. When the radiant heat is emitted from the heater 73, the reflection face 76*a* of the reflector 76 reflects the radiant heat to the nip formation pad 74.

As a result, the nip formation pad 74 is heated by the radiant heat emitted from the heater 73 toward the nip formation pad 74 and the radiant heat reflected by the reflector 76 to the nip formation pad 74. The heat is conducted from the nip formation pad 74 to the fixing belt 21 at the fixing nip N. In this case, the nip formation pad 74 that forms the nip N functions as a heat conductor that conducts heat to the fixing belt 71 at the nip N. To conduct heat, the nip formation pad 74 is made of a metal material having good thermal conductivity such as copper or aluminum.

The reflector 76 also functions as a support (stay) that supports the nip formation pad 74. Since the reflector 76 supports the nip formation pad 74 throughout the length of the fixing belt 71, the bending of the nip formation pad 74 is prevented and the nip N having a uniform width is formed between the fixing belt 71 and the pressure roller 72. The reflector 76 is preferably made of a metal material having relatively high rigidity such as SUS or SECC to ensure the function as a support.

The guides 79 are disposed inside the loop formed by the fixing belt 71 to guide the rotatable fixing belt 71 from the inside. Each of the guides 79 has a guide face 79*a* curving along an inner circumferential surface of the fixing belt 71. As the fixing belt 71 is guided along the guide face 79*a*, the fixing belt 71 smoothly rotates without being largely deformed.

As described above, the fixing device 70 that is illustrated in FIGS. 16 and 17 includes the reflector 76 to reflect the radiant heat emitted from the heater 73. The reflectance at each end portion 76*b* (see FIG. 17) of the reflection face 76*a* lower than the reflectance at a center portion 76*c* (see FIG. 17) of the reflection face 76*a* reduces the temperature rise of the belt holder 77 and the generation of the FP/UFP.

The embodiments described above are applied to the fixing device included in the electrophotographic image forming apparatus. However, one or more embodiments of the present disclosure may be applied to a heating device other than the fixing device, such as a drying device that is included in an inkjet image forming apparatus and dries liquid such as ink applied to a sheet.

The embodiments described above are given by way of example, and unique advantageous effects are achieved for each of the following aspects given below.

According to a first aspect, a heating device includes a rotator, a heating source, a reflector, a rotator holder, and a liquid or semi-solid substance. The rotator is rotatably held. The heating source heats the rotator. The reflector includes a reflection face that reflects radiant heat emitted from the heating source. The rotator holder holds a longitudinal end portion of the rotator. The liquid or semi-solid substance has lubricity and adheres to the rotator holder. The reflection face has a reflectance lower at each end portion of the reflection face in a longitudinal direction of the rotator than at a center portion of the reflection face in the longitudinal direction of the rotator.

According to a second aspect, in the heating device of the first aspect, the each end portion of the reflection face having a reflectance lower than a reflectance of the center portion of the reflection face is disposed at least at a position where the rotator holder is disposed in the longitudinal direction of the rotator.

According to a third aspect, in the heating device of the first or second aspect, the center portion of the reflection face includes a surface layer including silver, whereas the each end portion of the reflection face includes no surface layer including silver.

According to a fourth aspect, in the heating device of any one of the first to third aspects, the each end portion of the reflection face has a surface roughness greater than a surface roughness of the center portion of the reflection face.

According to a fifth aspect, in the heating device of any one of the first to fourth aspects, the each end portion of the reflection face is inclined toward the center portion of the reflection face with respect to an axis extending in the longitudinal direction of the rotator.

According to a sixth aspect, in the heating device according to any one of the first to fifth aspects, the substance having lubricity includes at least one of silicone oil and fluorine grease.

According to a seventh aspect, a fixing device includes the heating device of any one of the first to sixth aspects and a counter rotator that faces an outer circumferential surface of the rotator of the heating device, to heat a recording medium bearing an unfixed image and fix the unfixed image onto the recording medium.

According to an eighth aspect, an image forming apparatus includes the heating device of any one of the first to sixth aspects or the fixing device of the seventh aspect.

According to one aspect of the present disclosure, the generation of fine particles and ultrafine particles is reduced.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A heating device comprising:

a rotator rotatably held;

a heating source configured to heat the rotator;

a reflector including a reflection face that reflects radiant heat emitted from the heating source, the reflection face having a reflectance lower at each end portion of the reflection face in a longitudinal direction of the rotator than a reflectance at a center portion of the reflection face in the longitudinal direction of the rotator;

a rotator holder holding a longitudinal end portion of the rotator; and a liquid or semi-solid substance having lubricity and adhering to the rotator holder, wherein the reflector is configured to reduce rising temperature of the liquid or semi-solid substance adhering to the rotator holder by reducing the radiant heat emitted to the rotator holder.

2. The heating device according to claim 1, wherein the each end portion of the reflection face having the reflectance lower than the reflectance of the center portion of the reflection face is disposed at least at a position where the rotator holder is disposed in the longitudinal direction of the rotator.

3. The heating device according to claim 1, wherein the center portion of the reflection face includes a surface layer including silver, and wherein the each end portion of the reflection face does not include a surface layer including silver.

4. The heating device according to claim 1, wherein the each end portion of the reflection face has a surface roughness greater than a surface roughness of the center portion of the reflection face.

5. The heating device according to claim 1, wherein the each end portion of the reflection face is inclined toward the center portion of the reflection face with respect to an axis extending in the longitudinal direction of the rotator.

6. The heating device according to claim 1, wherein the substance having lubricity includes at least one of silicone oil or fluorine grease.

7. A fixing device comprising:

the heating device according to claim 1, configured to heat a recording medium bearing an unfixed image; and a counter rotator facing an outer circumferential surface of the rotator of the heating device, the counter rotator configured to fix the unfixed image onto the recording medium.

8. An image forming apparatus comprising the fixing device according to claim 7.

9. An image forming apparatus comprising the heating device according to claim 1.

10. The heating device of claim 1, wherein a temperature of the liquid or semi-solid substance adhering to the rotator holder is maintained to be equal or less than a temperature at which ultra-fine particles are generated by the liquid or semi-solid substance.

11. A heating device comprising:

a rotator rotatably held;

a heating source configured to heat the rotator;

a reflector including a reflection face that reflects radiant heat emitted from the heating source, each end portion of the reflection face is inclined toward a center portion of the reflection face with respect to an axis extending in a longitudinal direction of the rotator;

a rotator holder holding a longitudinal end portion of the rotator; and a liquid or semi-solid substance having lubricity and adhering to the rotator holder, wherein the reflector is configured to reduce rising temperature of the liquid or semi-solid substance adhering to the rotator holder by reflecting the radiant heat away from the rotator holder.

12. The heating device according to claim 11, wherein the substance having lubricity includes at least one of silicone oil or fluorine grease.

13. A fixing device comprising:

the heating device according to claim 11, configured to heat a recording medium bearing an unfixed image; and a counter rotator facing an outer circumferential surface of the rotator of the heating device, the counter rotator configured to fix the unfixed image onto the recording medium.

14. An image forming apparatus comprising the fixing device according to claim 13.

15. An image forming apparatus comprising the heating device according to claim 11.

16. The heating device of claim 11, wherein a temperature of the liquid or semi-solid substance adhering to the rotator holder is maintained to be equal or less than a temperature at which ultra-fine particles are generated by the liquid or semi-solid substance.

* * * * *